(12) United States Patent
Reisswig et al.

(10) Patent No.: US 11,275,934 B2
(45) Date of Patent: Mar. 15, 2022

(54) POSITIONAL EMBEDDINGS FOR DOCUMENT PROCESSING

(71) Applicant: SAP SE, Walldorf (DE)

(72) Inventors: Christian Reisswig, Berlin (DE); Stefan Klaus Baur, Heidelberg (DE)

(73) Assignee: SAP SE, Walldorf (DE)

(*) Notice: Subject to any disclaimer, the term of this patent is extended or adjusted under 35 U.S.C. 154(b) by 314 days.

(21) Appl. No.: 16/689,498

(22) Filed: Nov. 20, 2019

(65) Prior Publication Data

US 2021/0150201 A1 May 20, 2021

(51) Int. Cl.
*G06K 9/00* (2006.01)
*G06T 7/70* (2017.01)
*G06N 3/04* (2006.01)

(52) U.S. Cl.
CPC ....... *G06K 9/00463* (2013.01); *G06N 3/0454* (2013.01); *G06T 7/70* (2017.01);
(Continued)

(58) Field of Classification Search
CPC ............. G06K 9/00463; G06K 9/2054; G06K 9/2072; G06K 9/00449; G06K 9/00456; G06K 9/00442; G06K 9/4628; G06K 9/6271; G06K 9/726; G06K 9/344; G06K 9/00469; G06K 9/00483; G06K 9/325; G06K 9/3258; G06K 9/6262; G06K 9/6267; G06K 9/627; G06K 9/68; G06K 9/6878; G06K 2209/01; G06N 3/0454; G06N 3/08; G06N 3/0445; G06T 7/70; G06T 2207/20084; G06T 2207/30176;
(Continued)

(56) References Cited

U.S. PATENT DOCUMENTS

| 9,396,540 B1 * | 7/2016 | Sampson | G06F 16/355 |
| 10,402,641 B1 * | 9/2019 | Dang | G06Q 40/025 |

(Continued)

OTHER PUBLICATIONS

Extended European Search Report for European Patent Appl. No. 20206100.8, 7 pages, dated Apr. 13, 2021.
(Continued)

*Primary Examiner* — Michael S Osinski
(74) *Attorney, Agent, or Firm* — Sterne, Kessler, Goldstein & Fox P.L.L.C.

(57) ABSTRACT

Disclosed herein are system, method, and computer program product embodiments for generating document labels using positional embeddings. In an embodiment, a label system may identify tokens, such as words, of a document image. The label system may apply a position vector neural network to the document image to analyze the pixels and determine positional embedding vectors corresponding to the words. The label system may then combine the positional embedding vectors to corresponding word vectors for use as an input to a neural network trained to generate document labels. This combination may embed the positional information with the corresponding word information in a serialized manner for processing by the document label neural network. Using this formatting, the label system may generate document labels in a light-weight and fast manner while still preserving spatial relationships between words.

20 Claims, 6 Drawing Sheets

(52) U.S. Cl.
CPC .............. *G06K 2209/01* (2013.01); *G06T 2207/20084* (2013.01); *G06T 2207/30176* (2013.01)

(58) Field of Classification Search
CPC ........ G06F 40/30; G06F 40/58; G06F 40/279; G06F 40/205; G06F 40/284
See application file for complete search history.

(56) References Cited

U.S. PATENT DOCUMENTS

| | | | | |
|---|---|---|---|---|
| 10,540,579 | B2* | 1/2020 | Reisswig | G06K 9/726 |
| 10,915,788 | B2* | 2/2021 | Hoehne | G06K 9/00456 |
| 10,963,784 | B1* | 3/2021 | Gauthier | G06F 40/30 |
| 11,138,424 | B2* | 10/2021 | Denk | G06K 9/00463 |
| 2015/0215653 | A1* | 7/2015 | Hiratsuka | G06F 40/109 382/239 |
| 2018/0067957 | A1* | 3/2018 | Paterson | G06F 16/93 |
| 2018/0137551 | A1* | 5/2018 | Zheng | G06F 16/532 |
| 2019/0130231 | A1* | 5/2019 | Liu | G06K 9/6828 |
| 2019/0294874 | A1* | 9/2019 | Orlov | G06K 9/6218 |
| 2019/0311210 | A1* | 10/2019 | Chatterjee | G06N 5/046 |
| 2019/0385054 | A1* | 12/2019 | Zuev | G06F 40/216 |
| 2020/0026947 | A1* | 1/2020 | Kuhlmann | G06K 9/3208 |
| 2020/0110930 | A1* | 4/2020 | Simantov | G06N 20/00 |
| 2020/0117710 | A1* | 4/2020 | Okura | G06F 40/56 |
| 2020/0143160 | A1* | 5/2020 | Liu | G06K 9/6273 |
| 2020/0250263 | A1* | 8/2020 | Rimchala | G06F 40/284 |
| 2020/0302208 | A1* | 9/2020 | Hoehne | G06K 9/00442 |
| 2020/0394567 | A1* | 12/2020 | Choe | G06N 3/0454 |
| 2020/0401798 | A1* | 12/2020 | Foncubierta Rodriguez | G06F 16/2246 |
| 2021/0004627 | A1* | 1/2021 | Chen | G06K 9/6212 |
| 2021/0049394 | A1* | 2/2021 | Nakatani | G06K 9/00442 |
| 2021/0064861 | A1* | 3/2021 | Semenov | G06F 40/183 |
| 2021/0064908 | A1* | 3/2021 | Semenov | G06K 9/00456 |
| 2021/0073326 | A1* | 3/2021 | Aggarwal | G06F 40/177 |
| 2021/0081729 | A1* | 3/2021 | Huang | G06F 40/30 |
| 2021/0117438 | A1* | 4/2021 | Shrivastava | G06F 16/24578 |
| 2021/0125034 | A1* | 4/2021 | Nguyen | G06N 3/0445 |
| 2021/0133498 | A1* | 5/2021 | Zhang | G06K 9/00483 |
| 2021/0142083 | A1* | 5/2021 | Nakatani | G06K 9/00449 |
| 2021/0150202 | A1* | 5/2021 | Denk | G06K 9/00463 |
| 2021/0150338 | A1* | 5/2021 | Semenov | G06F 16/93 |
| 2021/0192200 | A1* | 6/2021 | Sugimoto | G06K 9/00449 |
| 2021/0216765 | A1* | 7/2021 | Xu | G06K 9/00456 |
| 2021/0271917 | A1* | 9/2021 | Xu | G06K 9/4628 |
| 2021/0334573 | A1* | 10/2021 | Kuhlmann | G06K 9/00442 |

OTHER PUBLICATIONS

Denk, T.I. et al., "BERTgrid: Contextualized Embedding for 2D Document Representation and Understanding," arXiv:1909.04948v2 [cs.CL], 4 pages, Oct. 14, 2019.

Devlin, J. et al., "BERT: Pre-training of Deep Bidirectional Transformers for Language Understanding," available at https://arxiv.org/pdf/1810.04805.pdf, 16 pages, May 24, 2019.

Katti, A.R. et al., "Chargrid: Towards Understanding 2D Documents," Proceedings of the 2018 Conference on Empirical Methods in Natural Language Processing, pp. 4459-4469, Oct. 31-Nov. 4, 2018.

Vaswani, A. et al., "Attention Is All You Need," available at https://arxiv.org/pdf/1706.03762.pdf, 15 pages, Dec. 6, 2017.

\* cited by examiner

POSITIONAL EMBEDDINGS FOR DOCUMENT PROCESSING

BACKGROUND

Optical character recognition (OCR) has been used to identify characters in documents. Further, machine learning algorithms have been developed to identify characters and words within document images based on applied OCR techniques. For example, characters, words, or symbols may be extracted from a document image. These techniques, however, may not preserve positional information related to the symbols. For example, these techniques may not consider the layout of the document symbols. The lack of this positional information may introduce difficulties in analyzing the content of the document. Even document data files including textual and positional information may yield inaccurate and/or incorrect results if the positional information is not considered during document processing.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating document labels using positional embeddings. The embodiments disclosed herein may analyze a document image to identify a sequence of position parameters for symbols or tokens of the document image. These position parameters may be used to preserve the layout information of the tokens in the document image and may provide increased accuracy during label generation. For example, if the label generation process uses a serialized machine learning or artificial intelligence format, the position parameters may be embedded with the symbols to preserve the positional information. Using these embeddings, labels may be generated using the positional information to achieve higher accuracy with an accelerated learning process.

In an embodiment, a label system may receive a document and/or document image and generate labels using positional embeddings. Labels may identify particular values and/or symbols from the document and/or document image used in processing the document. For example, the document may be an invoice and a label may be generated identifying the symbol or token representing the total amount of the invoice based on a document processing. Labels may also identify key-value pairs, named entities, and/or other semantic information from the document. The label system may generate these labels and/or identify the particular symbols or tokens using the positional information to provide increased accuracy.

The positional embedding information may aid in document analysis. For example, certain information may yield a pattern based on the positioning of words. To illustrate an example embodiment, a document may be an invoice with a "First name" field. The input for this field may be "John" but may be arranged in various ways. For example, the input could be arranged below the field label, to the right of the field label, or above the field label. These three configurations are illustrated below:

(1)
First name
John
(2)
First name: John
(3)
John
First name

Analyzing several documents as well as the spatial positions of these input values may aid in more accurately identifying and labeling the correct value. By using positional embeddings, such as a horizontal and/or vertical position, machine learning models may better identify values and analyze the document.

An issue with some machine learning models, however, may be the use of serialized tokens. For example, some natural language processing techniques may analyze documents in a one-dimensional sequence of characters or words. This type of processing may result in the loss of two-dimensional information and/or the relationship between words or token in a document.

In this manner, to preserve the positional information, the label system described herein may perform a positional embedding to preserve the position information. The positional embedding may preserve two-dimensional coordinates corresponding to the positions of the words or tokens of the document. In some embodiments, the label system may receive a document and/or document image as a data file. The label system may identify the characters, words, and/or other groupings of characters as the tokens of the document. For example, the label system may perform an optical character recognition (OCR) process to identify the characters and/or words. In some embodiments, the document may be a data file containing formatted text such as, for example, HTML, Word text, plain text, formatted text, and/or other text data files. In this case, the label system may skip an OCR process and identify the text and/or positional information directly from the document data file. For example, the label system may use a file reader or converter.

The label system may also use a first neural network to identify positional embeddings corresponding to the characters and/or words. The first neural network may identify a sequence of positional embeddings. This sequence may be combined with the sequence of input word vectors and applied to a second neural network. The second neural network may generate the labels based on the combination of the word vectors with the positional embedding vectors. As will be further explained below, the first neural network and the second neural network may be subnetworks of a combined neural network. Similarly, the first and second neural networks may be trained jointly or sequentially.

By combining the positional embeddings with the vector values of the words, the label system may preserve the positional information when generating labels. The label system may utilize this positional information in the second neural network when generating labels to generate more accurate results. This configuration may further preserve positional information for use even when the second neural network uses a one-dimensional and/or sequential formatting. For example, this configuration may extract data from a table and preserve the table organization. In this manner, the two-dimensional information of a document may be preserved and utilized even in one-dimensional language models or neural networks. This configuration may also be less computer resources intensive and may be more efficient in training a machine learning model. This process may accelerate the machine learning process and also yield higher accuracy. Additionally, the neural network configuration may use less layers allowing for less resource intensive processing. In this manner, the configuration may be light-weight and fast when classifying characters and/or words of a document while still capturing the positional embeddings of each character or word.

Various embodiments of these features will now be discussed with respect to the corresponding figures.

Figure 1A:
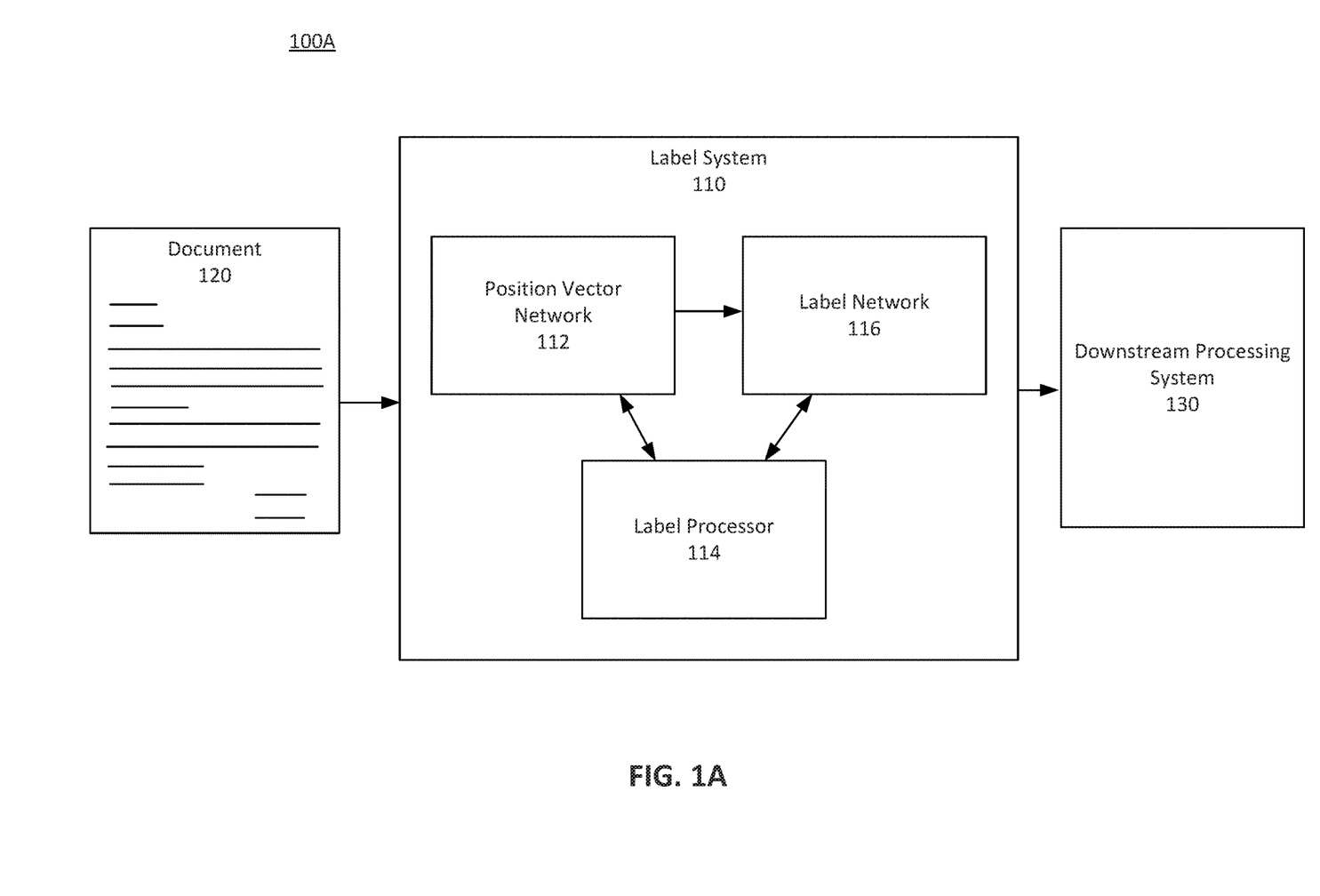
FIG. 1A depicts a block diagram of a document processing environment, according to some embodiments.

FIG. 1A depicts a block diagram of a document processing environment 100A, according to some embodiments. Document processing environment 100A may include label system 110, downstream processing system 130, and document 120. Document 120 may include handwritten and/or typewritten text. Document 120 may be an image of a document and/or other type of data file having characters that may be identified. Document 120 may include characters and/or groupings of characters. In some embodiments, document 120 may include different languages and/or symbols representing different alphabets.

Label system 110 may receive document 120 and generate positional embeddings and/or labels to identify values of document 120. Label system 110 may include position vector network 112, label processor 114, and/or label network 116 to process document 120. Label processor 114 may manage position vector network 112 and/or label network 116. Label processor 114 may include one or more processors and/or memory configured to implement neural networks or machine learning algorithms. Position vector network 112 may be a neural network and/or other machine learning model configured to identify positional embeddings of characters, words, symbols, and/or tokens of document 120. Label network 116 may use these positional embeddings and/or word vector values to generate a label. Label processor 114 may control this process.

In an embodiment, label system 110 may receive document 120 from an external source, such as a transmission from an external computer, and/or may retrieve document 120 from an accessible memory. Label processor 114 may analyze document 120 to identify, characters and/or groupings of characters such as words. Label processor 114 may perform an optical character recognition (OCR) process to identify the characters. Based on the programming of label processor 114, label processor 114 may identify groups of characters as symbols or tokens for labeling. For example, label processor 114 may identify a word as a token. As will be further explained with reference to FIG. 2, label processor 114 may further identify "$w_i$" as a sequence of input word vectors. For example, each word vector may represent a word of document 120.

In addition to identifying tokens of document 120, label system 110 may use position vector network 112 to identify positional embedding vectors corresponding to the tokens. As will be further explained with reference to FIG. 2, position vector network 112 may identify a "$x_i$" as a sequence of positional embedding vectors. In an embodiment, position vector network 112 may determine the positional embeddings using a two-dimensional image-based or character grid-based convolutional neural network. A layer of the convolutional neural network, such as, for example, the last layer, may be serialized into a one-dimensional sequence of vectors to determine the two-dimensional positional embeddings. To identify these positional embeddings, position vector network 112 may analyze the pixels of document 120. Position vector network 112 may operate as an encoder for two-dimensional positional embeddings to identify complex two-dimensional positional embeddings which may change depending on the text layout of document 120.

Figure 4:
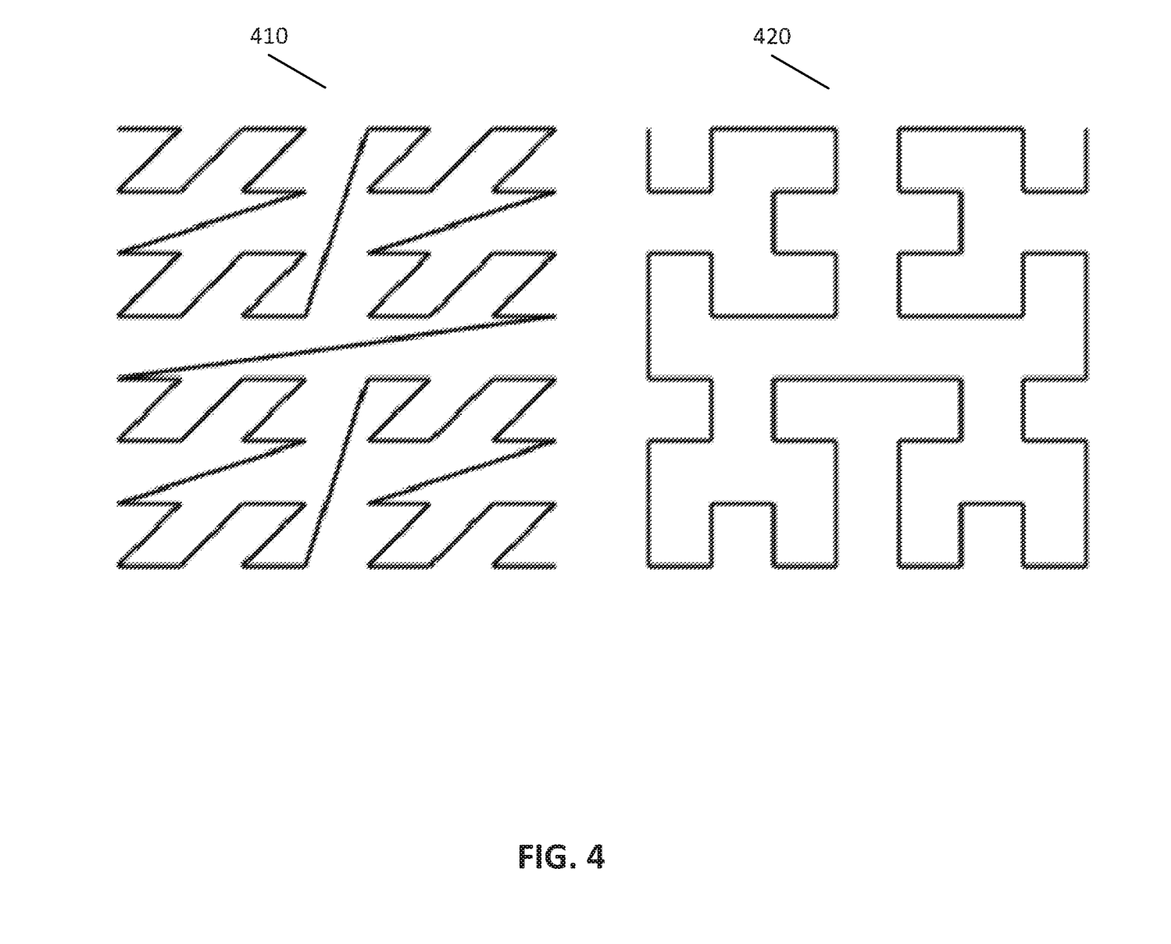
FIG. 4 depicts example serialization techniques, according to some embodiments.

In an embodiment, position vector network 112 may perform serialization by mapping pixels and/or positional embeddings using space-filling curves such as Morton or Hilbert-Lebesgue curves. FIG. 4 depicts serialization techniques, according to some embodiments. For example, Morton curve 410 and/or Hilbert-Lebesgue curve 420 may be used to generate a serialization of a sequence of two-dimensional embeddings. In some embodiments, the Hilbert-Lebesgue curve 420 may provide better spatial locality. While the figures may depict one feature map channel, each element may correspond to a vector. The vectors may be the positional embeddings. As will be further explained below, a serialization or space-filling curve may be used as a last encoding layer of position vector network 112 to identify the positional embeddings.

During training or operation, position vector network 112 may operate to identify positional embeddings for the characters, words, and/or tokens of document 120. In this case, the last feature layer of position vector network 112 may utilize a padding mask to obtain a sufficient amount of pixels to map the sequence of tokens. In cases where the sequence is shorter than the number of available positional embeddings, position vector network 112 may use a padding mask to perform the deep-learning and/or natural language processing.

After identifying the positional embeddings, label processor 114 may combine the positional embeddings with the input word vectors as inputs to label network 116. For example, a positional embedding vector "$x_i$" may be identified for each input word vector "$w_i$". These positional embedding vectors may map information about the location of a particular token of the two-dimensional document into a higher dimensional space. The dimension may be the same or different from the input word vectors. Label processor 114 may combine and/or append the positional embedding vectors to the input word vectors and supply the combination as inputs to label network 116. In this manner, the combination may preserve the two-dimensional layout information for the label generation process.

Label network 116 may be a transformer neural network that may produce a sequence of labels as an output. In some embodiments, label network 116 may be a neural network that does not preserve or rely on spatial locality and/or a spatial ordering of tokens. As previously explained, label network 116 may utilize the sequence of two-dimensional embedding vectors combined with each word vector to generate the labels. Label network 116 may have been previously trained to identify labels based on the word vector values as well as the positional embeddings. In cases where label network 116 is a transformer-based sequence tagging machine learning model, each element of the sequence (such as a word or character) may be compared to each other element in each layer of label network 116. In this manner, this comparison may identify out-of-order relationships between arbitrary elements of an input sequence. By including positional embedding information when using these transformer-based systems, spatial relationships between elements may be preserved. For example, the spatial relationship between words may be preserved. This information may further aid in identifying and generating accurate labels.

While position vector network 112 and label network 116 are depicted as separate neural networks, in some embodiments, they may be implemented using a single neural network. Similarly, position vector network 112 and label network 116 may be trained jointly or sequentially. To train the networks separately, label system 110 may freeze position vector network 112 while training label network 116. In some embodiments, position vector network 112 may be pretrained by predicting a sequence of words included in document 120. In this manner, label system 110 may train distinct subnetworks or train a joint neural network to identify the positional embeddings and/or labels. Similarly, when analyzing documents, label system 110 may use either configuration.

Figure 2:
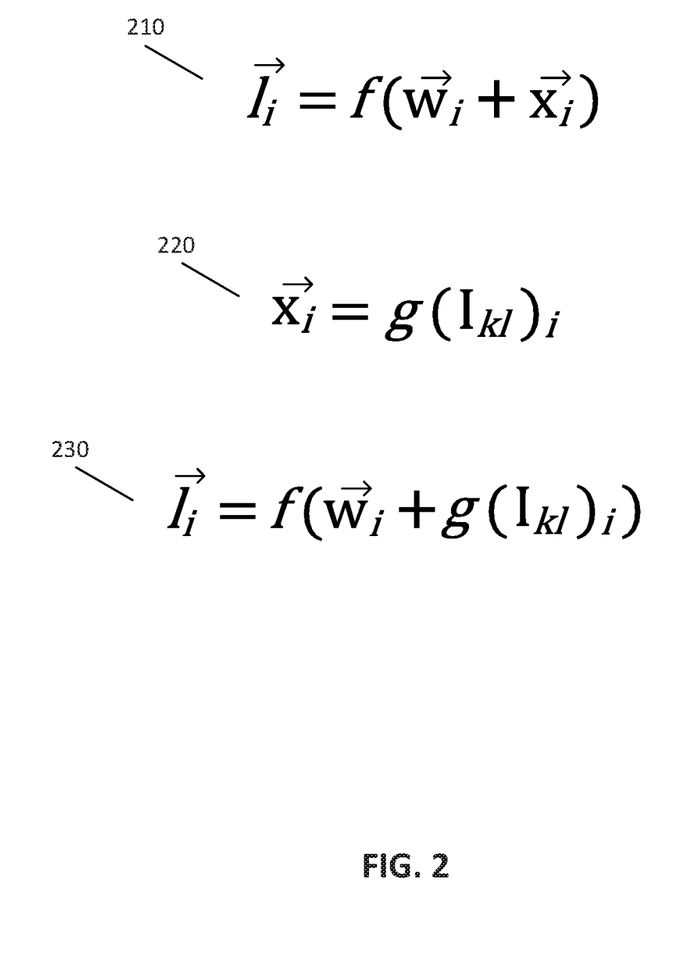
FIG. 2 depicts example network equations, according to some embodiments.

Referring now to FIG. 2, FIG. 2 depicts network equations 210, 220, and 230, according to some embodiments. These network equations 210-230 further illustrate the operation of label system 110, position vector network 112, and label network 116.

Position vector network 112 may use position vector equation 220 to determine a sequence of positional embedding vectors "$x_i$". This value may be positional embedding vector for the i-th word of document 120. The function "g" may represent a two-dimensional image-based or character grid-based two-dimensional convolutional encoder network. As previously described, a layer of the network may be serialized into a one-dimensional sequence of vectors. For example, the last layer of position vector network 112 may be serialized to generate the positional embeddings. In position vector equation 220, the operand of the function may be "$I_{kl}$" which may represent the pixels of document 120. The operand may represent the k-th and l-th pixel in the document. The pixels may be character and/or word pixels of a document image and/or a character grid. By applying the function to each grouping of pixels, position vector network 112 may determine positional embedding vectors for each character, word, or token of document 120.

Label prediction equations 210 and 230 may be used to generate a sequence of labels "$l_i$". Label network 116 may be a transformer network that uses label prediction equations 210 and 230. Label prediction equations 210 and 230 may represent the transformer network using the function "f". The operand for the transformer network may be the combination of a token vector and a positional embedding vector. In some embodiments, the token vector may be word vector "$w_i$" while the positional embedding vector may be "$x_i$" as determined by position vector network 112. The combination may be generated by appending a positional embedding vector to each word vector representing each word of document 120. In this manner, label network 116 may use the positional embeddings output from position vector network 112 with the word vectors to generate labels as shown in label prediction equations 210 and 230.

As previously described, position vector network 112 and label network 116 may be separate neural networks managed by label processor 114. Label prediction equations 210 and 230 may illustrate the interaction between position vector network 112 and label network 116. For example, as seen in label prediction equation 230, label network 116 may incorporate the output from position vector network 112. In some embodiments, position vector network 112 and label network 116 may be implemented using the same neural network. In this case, the common neural network may implement label prediction equation 230 and perform the pixel analysis to identify the positional embeddings. The positional embeddings may then be used to generate the labels.

Returning to FIG. 1A, after label system 110 has generated the labels, label system 110 may store these labels and/or utilize the labels in downstream document processing tasks. For example, a labeled version of document 120 may be stored in a database for indexing and/or archiving. The labeled values may be extracted and/or further manipulated in a downstream process. In some embodiments, label system 110 may transmit the labels and/or document 120 to downstream processing system 130 for further processing. Downstream processing system 130 may be a system external to label system 110 and may be connected via wired or wireless connection.

Figure 1B:
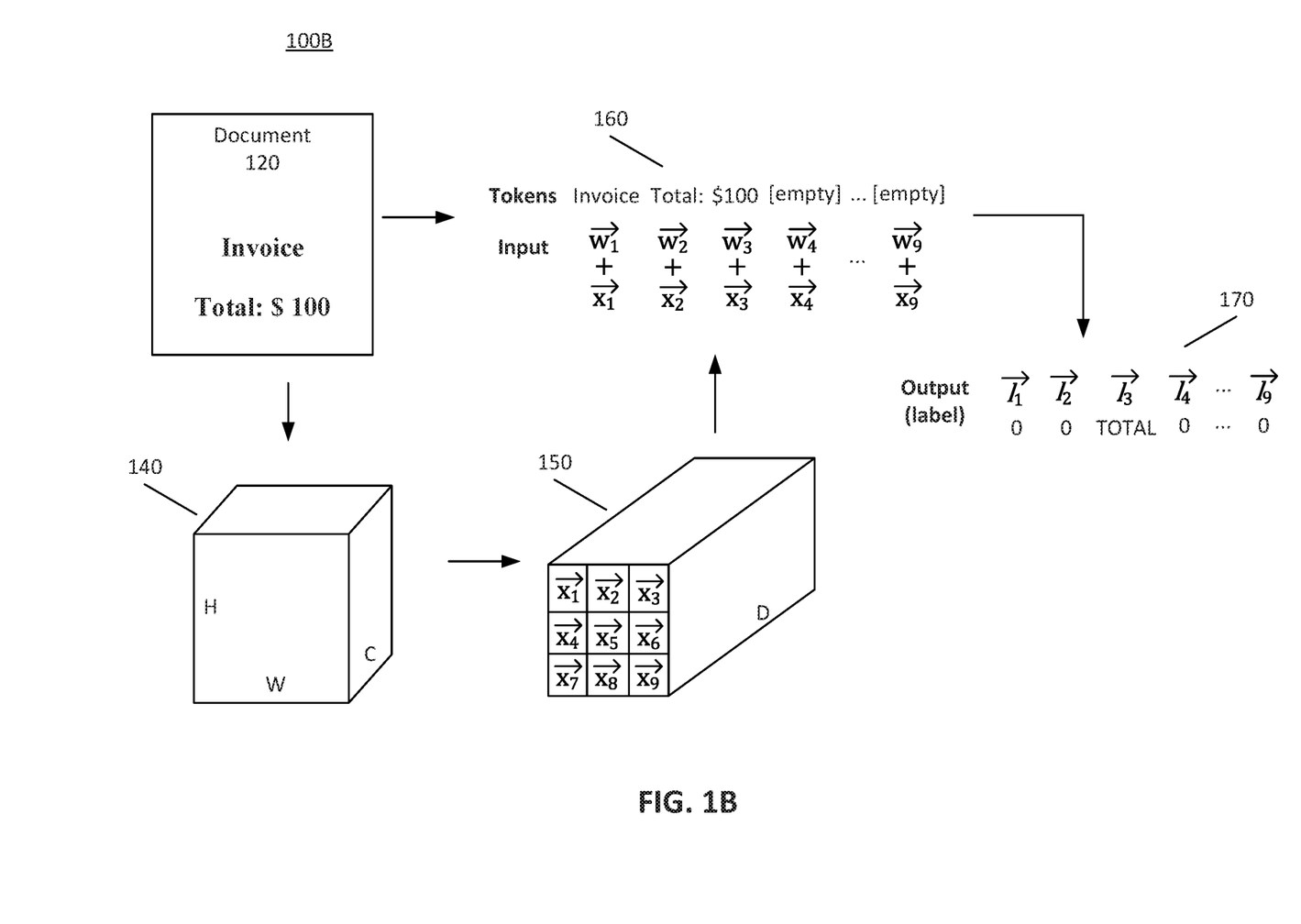
FIG. 1B depicts a block diagram of a document processing flow, according to some embodiments.

To illustrate an example embodiment of label generation, FIG. 1B will now be discussed. FIG. 1B depicts a block diagram of a document processing flow 100B, according to some embodiments. Document 120 may be a data file of a document image. The document image may depict an invoice with the textual characters "invoice" and "Total: $100". In an embodiment, label system 110 may apply an optical character recognition (OCR) process to identify the characters of document 120. In some embodiments, document 120 may be a data file containing formatted text such as, for example, HTML, Word text, plain text, formatted text, and/or other text data files. In this case, label system 110 may skip the OCR process and identify the text and/or positional information directly from document 120. For example, label system 110 may use a file reader or converter.

Label system 110 may also identify tokens such as words from document 120 by identifying groupings of characters. For example, label system 110 may group characters based on an identification of blank space between groups of characters based on a pixel analysis. These groupings may be words that may correspond to word vectors used during the label generation process. For example, the word "Invoice" may be denoted as word vector "$w_i$" while "Total:" and "$100" may be denoted as words vectors "$w_2$" and "$w_3$" respectively. For these word vectors, label system 110 may identify positional embedding vectors.

To identify the positional embedding vectors, label system 110 may apply the OCR process to obtain a sequence of word tokens. This may generate a tokenized document 140. The tokenized document 140 may have C channels, a height H, and weight W. Label processor 114 may generate tokenized document 140 and pass tokenized document 140 to position vector network 112. Position vector network 112 may be a two-dimensional encoder network, such as, for example, a deep convolutional neural network. The neural network may generate vectors 150. Vectors 150 may then be serialized for combining with the word vectors. An encoder feature map of the network may be serialized using the Morton curve 410 or Hilbert-Lebesgue curve 420 as depicted and described with reference to FIG. 4. This analysis may be performed for each word to identify corresponding positional embedding vectors and to produce a sequence of two-dimensional embeddings. The serialization curves may "unroll" the vectors 150 and/or flatten a feature map in a manner that preserves the locality of elements. This locality may aid in preserving the relative distances of words and whether words are close or far from other words.

Label processor 114 may then combine the serialized positional embedding vectors "$x_i$" with the word vectors "$w_i$". In some embodiments, the positional embedding vectors may be appended to the word vectors. These combinations 160 may be generated for each token or word of document 120, For example, for the token "$100", the corresponding combination may be "$w_3+x_3$", The combinations 160 may then be applied to label network 116. As previously described label network 116 may be a transformer network configured to identify labels.

Label network 116 may be trained to identify one or more labels. For example, label network 116 may have been previously trained to identify a total amount of an invoice based on training data using positional embeddings. In this manner, label network 116 may output label sequence 170 indicating a particular class description as a label. If the total amount was the third word identified as "$w_3$", the label may identify this third word as the desired total amount class. Label system 110 may then extract this value using the label for additional document processing. In some embodiments, the labeling may aid in extracting values and/or classifying document 120. Depending on the configuration of label network 116, other words may be given null or zero values in label sequence 170 which may indicate that the other words do not fall within the total amount category desired. In some embodiments, each word may be given a label depending on a categorization for each word.

Label system 110 may also perform flow 100B to perform a translation of words into different languages. For example, label system 110 may be applied for translation where languages have different lengths of characters or words. Label system 110 may not require a one-to-one translation and instead may be adaptable to different sequence lengths between different languages. The labels generated and/or information extracted may be used to translate document 120. Similarly, the label generation may aid in summarizing two-dimensional documents. The identification of labels may provide fast summaries by identifying key values.

Figure 3:
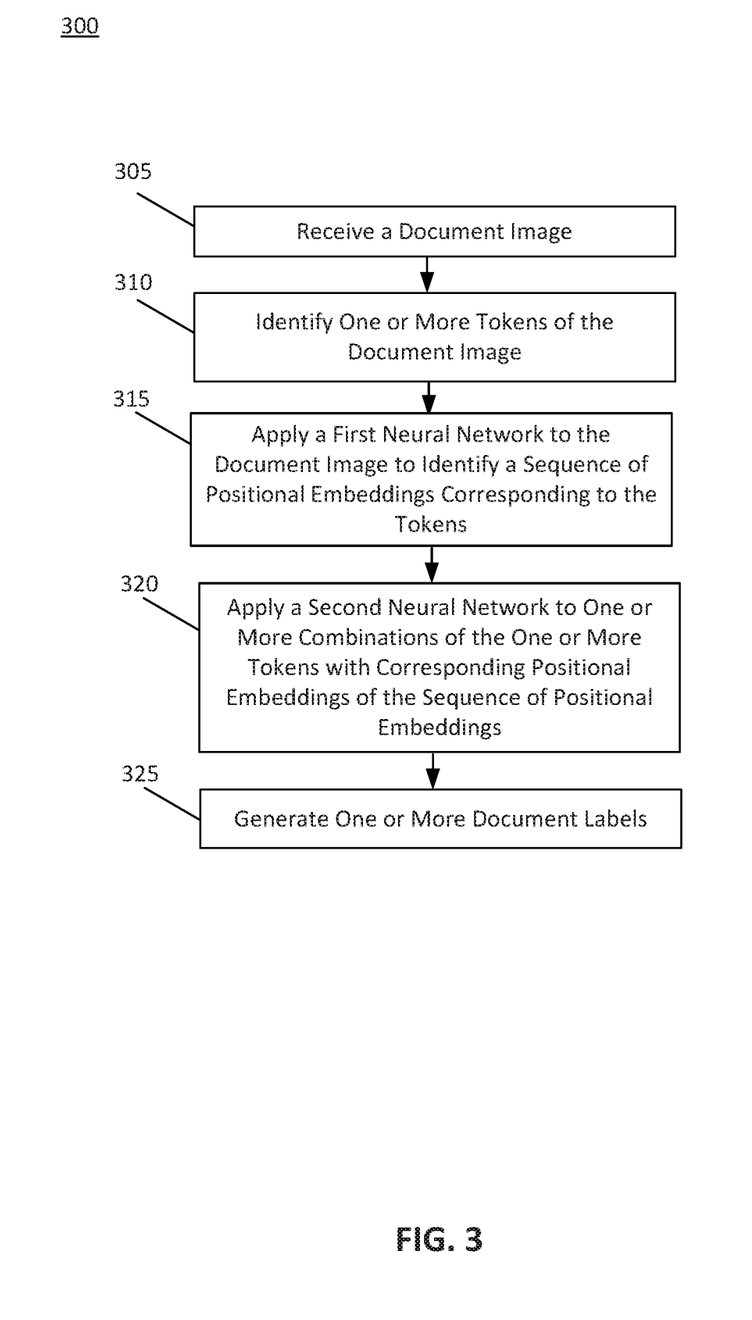
FIG. 3 depicts a flowchart illustrating a method for generating document labels, according to some embodiments.

FIG. 3 depicts a flowchart illustrating a method 300 for generating document labels, according to some embodiments. Method 300 shall be described with reference to FIG. 1A; however, method 300 is not limited to that example embodiment.

In an embodiment, a label system 110 may analyze document 120 using one or more neural networks to identify document labels. While method 300 is described with reference to label system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, label system 110 may receive a document image. The document image may be document 120. Label system 110 may access the document image from a storage location in a computer memory and/or may receive the document image from an external computer system. The document image may be a text, document, and/or image data file. The document image may include handwritten and/or typewritten text.

At 310, label system 110 may identify one or more tokens of the document image. To identify the one or more tokens, label system 110 may apply an optical character recognition (OCR) service. The OCR service may provide mappings for the characters detected in the document image to numerical index values. The OCR service may perform pixel analysis to determine these character values. In some embodiments, the OCR service may identify tokens as groupings of characters. For example, a token may be a word, phrase, sentence, paragraph, or other organization of characters. Label system 110 may identify tokens from one or more languages. In some languages, characters may be specified as a token, such as, for example, Chinese. Label system 110 may identify these tokens to generate one or more word vectors "$w_i$".

In some embodiments, the document image may be a data file containing formatted text such as, for example, HTML, Word text, plain text, formatted text, and/or other text data files. In this case, label system 110 may skip an OCR process and identify the text and/or positional information directly from the document data file. For example, label system 110 may use a file reader or converter. Label system 110 may directly identify the one or more tokens from the document data file.

At 315, label system 110 may apply a first neural network to the document image to identify a sequence of positional embeddings corresponding to the tokens. The first neural network may be position vector network 112. As previously described above, the first neural network may identify positional embeddings for the words of the document image. The positional embeddings may be generated based on a pixel identification performed by a two-dimensional encoder network or a deep convolutional neural network. A feature map generated by the encoder may be serialized to produce a sequence of two-dimensional positional embeddings corresponding to the tokens of the document image. The serialization may be performed by using a Morton curve, a Hilbert-Lebesgue curve, and/or other serialization methods to preserve spatial locality. This flattening may produce the sequence of positional embeddings.

At 320, label system 110 may apply a second neural network to one or more combinations of the one or more tokens with corresponding positional embeddings of the sequence of positional embeddings. The second neural network may be label network 116. The combination of the one or more tokens with the corresponding positional embedding may include appending a positional embedding vector to its corresponding token identified from the document image. This configuration may arrange the one or more combinations into a one dimensional sequence for analysis by label network 116. Label network 116 may then process the sequence of combinations to identify labels depending on the configuration and previous training of label network 116.

At 325, label system 110 may generate one or more document labels. These document labels may be generated by label network 116 based on the combinations of one or more tokens with the corresponding positional embeddings. The document labels may identify particular values for data extraction from the document image, for document classification, and/or for other document processing. In some embodiments, document labels may identify desired values. In some embodiments, document labels may be provided for multiple tokens of the document image to provide additional document labeling. Label system 110 may use and/or store these labels with the document image for further document processing. In some embodiments, label system 110 may transmit the one or more document labels to a downstream processing system 130. The downstream processing system 130 may be an external system that uses the one or more document labels to perform additional processing on the document image.

Figure 5:
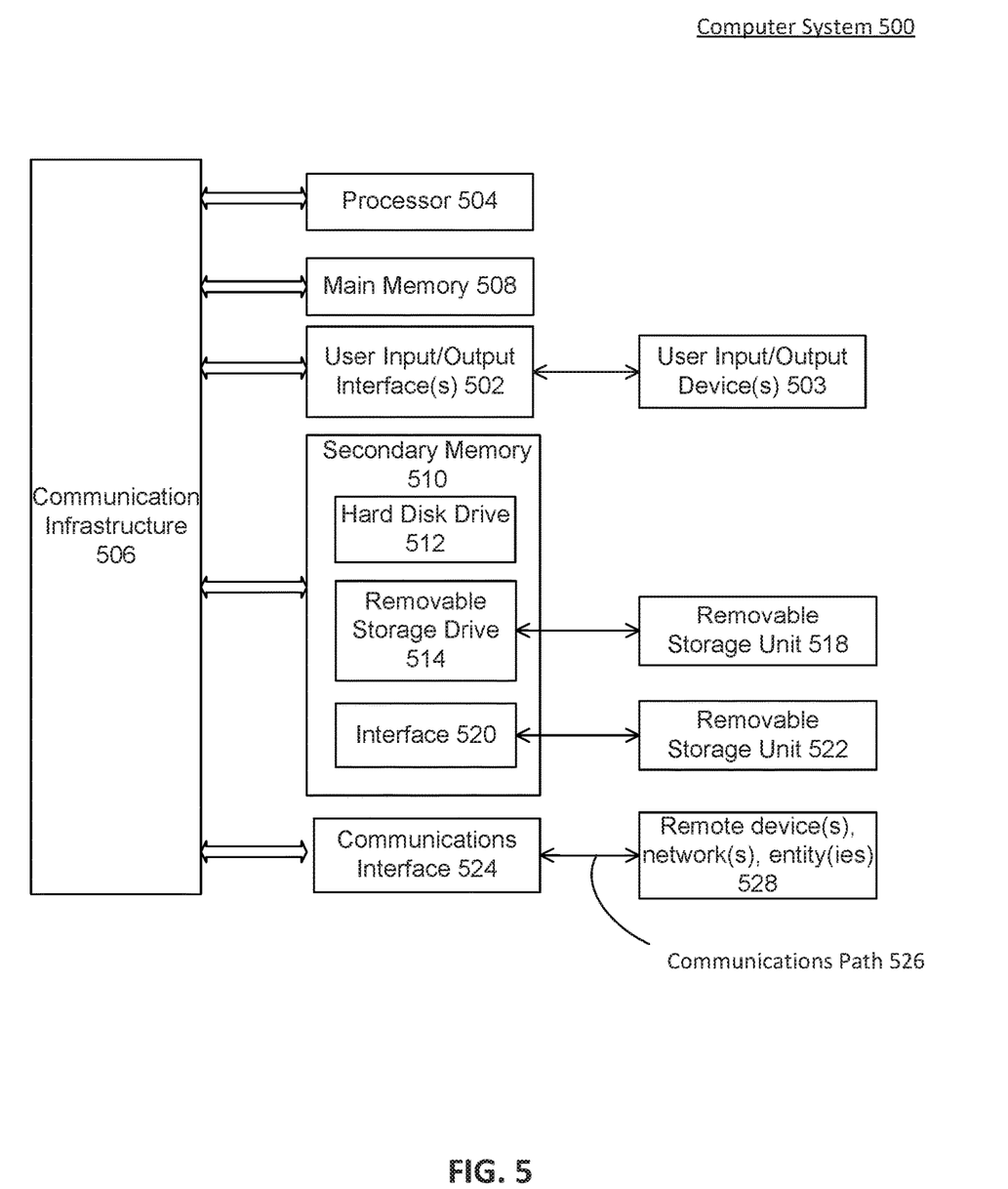
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include; for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot; and/or any other removable storage unit and associated interface.

Computer system 500 may further include a communication or network interface 524. Communication interface 524 may enable computer system 500 to communicate and interact with any combination of external devices, external networks, external entities, etc, (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving a document image;
identifying one or more tokens of the document image;
applying a first neural network to the document image to identify a sequence of positional embeddings corresponding to the one or more tokens;
applying a second neural network to one or more combinations of the one or more tokens with corresponding positional embeddings of the sequence of positional embeddings; and
in response to applying the second neural network, generating one or more document labels.

2. The computer implemented method of claim 1, wherein the one or more tokens are words of the document image.

3. The computer implemented method of claim 1, wherein the sequence of positional embeddings are vectors corresponding to the one or more tokens.

4. The computer implemented method of claim 1, wherein applying the first neural network further comprises:
applying a space-filling curve to serialize position vectors to identify the sequence of positional embeddings.

5. The computer implemented method of claim 1, wherein the one or more combinations are generated by appending a positional embedding to a corresponding token of the one or more tokens.

6. The computer implemented method of claim 1, wherein the one or more combinations are arranged in a one dimensional sequence for analysis by the second neural network.

7. The computer implemented method of claim 1, wherein the first neural network and the second neural network are subnetworks of a single neural network.

8. A system, comprising:
a memory; and
at least one processor coupled to the memory and configured to:
receive a document image;
identify one or more tokens of the document image;
apply a first neural network to the document image to identify a sequence of positional embeddings corresponding to the one or more tokens;
apply a second neural network to one or more combinations of the one or more tokens with corresponding positional embeddings of the sequence of positional embeddings; and
in response to applying the second neural network, generate one or more document labels.

9. The system of claim 8, wherein the one or more tokens are words of the document image.

10. The system of claim 8, wherein the sequence of positional embeddings are vectors corresponding to the one or more tokens.

11. The system of claim 8, wherein to apply the first neural network, the at least one processor is further configured to:
apply a space-filling curve to serialize position vectors to identify the sequence of positional embeddings.

12. The system of claim 8, wherein the one or more combinations are generated by appending a positional embedding to a corresponding token of the one or more tokens.

13. The system of claim 8, wherein the one or more combinations are arranged in a one dimensional sequence for analysis by the second neural network.

14. The system of claim 8, wherein the first neural network and the second neural network are subnetworks of a single neural network.

15. A non-transitory computer-readable device having instructions stored thereon that, when executed by at least one computing device, cause the at least one computing device to perform operations comprising:
receiving a document image;
identifying one or more tokens of the document image;
applying a first neural network to the document image to identify a sequence of positional embeddings corresponding to the one or more tokens;
applying a second neural network to one or more combinations of the one or more tokens with corresponding positional embeddings of the sequence of positional embeddings; and
in response to applying the second neural network, generating one or more document labels.

16. The non-transitory computer-readable device of claim 15, wherein the one or more tokens are words of the document image.

17. The non-transitory computer-readable device of claim 15, wherein the sequence of positional embeddings are vectors corresponding to the one or more tokens.

18. The non-transitory computer-readable device of claim 15, wherein applying the first neural network further comprises:
 applying a space-filling curve to serialize position vectors to identify the sequence of positional embeddings.

19. The non-transitory computer-readable device of claim 15, wherein the one or more combinations are generated by appending a positional embedding to a corresponding token of the one or more tokens.

20. The non-transitory computer-readable device of claim 15, wherein the one or more combinations are arranged in a one dimensional sequence for analysis by the second neural network.

* * * * *